UNITED STATES PATENT OFFICE 2,356,562

PREPARATION OF SYNTHETIC RESINS

Herbert Berg and Herbert Mader, Burghausen, Oberbayern, Germany; vested in the Alien Property Custodian No Drawing. Application April 22, 1938, Serial No. 203,674. In Germany April 28, 1937

2 Claims. (Cl. 260—656)

This invention relates to synthetic resins; more particularly it relates to the polymerization of vinyl halogen compounds to form polymers of an exceptionally high degree of polymerization. The vinyl halogen compounds which are particularly adapted to be polymerized in accordance with the invention are those wherein one of the olefinic carbon atoms of the vinyl radical is joined to a single halogen atom. Such compounds may be represented by the structural formula

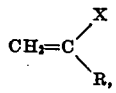

wherein X represents a halogen atom and R represents a hydrogen atom or a hydrocarbon radical. The most important compounds of this class are the vinyl halides, e. g. vinyl chloride and the halogenated butadienes, e. g. chloroprene (2-chloro-1,3-butadiene).

The polymerization products of vinyl halides, chlorobutadienes and other vinyl halogen compounds, as prepared by the usual polymerization methods, are somewhat deficient in mechanical and electrical insulating properties and in resistance to the action of chemical reagents; for this reason their adaptability for many purposes has been limited. It has been recognized heretofore that the more highly polymerized forms of these compounds have better chemical and physical properties than the lower polymers. However, the most highly polymerized products that can be obtained by means of the usual polymerization methods are admixed with lower polymers which adversely affect the properties of the product. While some degree of separation of the lower polymers can be effected by means of fractional solution and precipitation with various solvents, such methods are tedious and expensive, and, in general, yield products which are still contaminated to some extent with the lower polymers.

It is an object of the present invention to provide highly polymerized vinyl halogen compounds which are substantially free from lower polymers. A further object is to provide a direct and economical method for the preparation of such polymers. Other objects will be apparent from the ensuing description of the invention.

The present invention is based upon the discovery that certain impurities (probably halogen containing compounds) that are normally present in the vinyl halogen compounds tend to cause the production of lower polymers and thereby prevent the formation of polymers of a uniformly high degree of polymerization. We have further discovered that such impurities may be removed by treatment of the monomeric vinyl halogen compounds with alkaline materials, and that uniformly high polymers may be obtained by polymerizing the thus purified monomers by means of the usual polymerization methods.

By the process of the invention, extremely highly polymerized products are obtained which, in their chemical and physical properties, are far superior to the heretofore known products. The process of the present invention offers not only a means to produce individual polymers, but also renders it possible to produce mixtures of polymers of highly improved properties, such as mixed polymers or interpolymers of two or more vinyl halogen compounds or of one or more vinyl halogen compunds with one or more other polymerizable substances, such as esters and ethers of vinyl alcohol, acrylic acid, methacrylic acid, itaconic acid and their derivatives.

Alkaline materials in general are effective for purifying the monomeric vinyl halogen compounds, the stronger alkalies, such as alkali metal hydroxides, being most effective. Thus, aqueous solutions of sodium or potassium hydroxide of 25% to 60% concentration and preferably of 40% to 50% concentration are especially suitable. Heating may be employed to accelerate the purifying action. According to a specific mode of carrying out the invention the monomeric raw materials are passed through the purifying liquid in the vapor state, the temperature of the purifying liquid being kept sufficiently high to prevent condensation of the monomers.

We have further found that the deleterious impurities tend to reform in the purified materials upon standing. It is therefore advisable to subject the raw materials to the polymerization treatment as soon as possible after the alkali treatment. The purified raw materials, depending upon the conditions of storage, should not be stored longer than from about a few hours to one day prior to polymerization.

The purified vinyl halogen compounds polymerize very readily and uniformly, either alone or in admixture with other purified vinyl halogen compounds of the same type or with other compounds which are capable of being polymerized. It is thus possible to transform them in a single operation at relatively low temperatures into polymers of the highest degree of polymerization. Thus, for example, in the production of polymerized vinyl chloride it is possible to obtain polymers of high molecular weight which are insoluble in practically all known solvents at room temperatures. Likewise, with other vinyl halogen compounds, corresponding polymerization products of highest molecular weight can be obtained.

The polymerization itself can be carried out by any of the generally known methods, as for example by exposing the monomeric material to light or by heating in the presence of polymerization catalysts such as hydrogen peroxide, organic peroxides and the like, in the presence or absence of solvents. A particularly suitable method consists in dispersing the monomer together with a polymerization catalyst in a non-solvent such as water and heating to polymerize the material in the dispersed phase. In order to maintain the monomer in dispersed condition, a suitable emulsifying agent is added to the dispersing medium. The emulsifying agents should preferably exert no saponifying action on the dispersed material; particularly suitable emulsifying agents are the water-soluble partial esters, ethers, acetals and ester-acetals of polyvinyl alcohol. Vessels for carrying out the reaction should be constructed of or lined with corrosion-resistant materials such as stainless steel ($V_4A$ and $V_2A$ alloys are suitable) aluminum, lead, nickel or the like.

For best results the polymerization should be carried out at temperatures lower than 40° C., preferably at a temperature of 30 to 35° C. To obtain strictly uniform products it is also important to keep the polymerization temperature within constant narrow limits during the entire course of the polymerization.

In order to avoid any substantial formation of lower polymers, the polymerization should be interrupted when about 40% to 60% of the monomeric raw materials have not yet been polymerized.

The invention is illustrated but not restricted by the following examples:

*Example I*

Vinyl chloride is passed in the vapor phase through a 50% sodium hydroxide solution in a washing tower. Immediately after this purification process, the purified vinyl chloride is polymerized as follows:

A mixture consisting of 500 parts by weight of the purified vinyl chloride, 500 parts by weight water, 1 part by weight of benzoyl peroxide and 2 parts by weight of incompletely saponified polyvinyl acetate, (having a saponification number of 80 to 100) is continuously stirred in an autoclave of pure nickel at a constant temperature of 35° C. for 120 hours.

The polymerization is then interrupted and the unpolymerized vinyl chloride is distilled out of the autoclave. The pure white polyvinyl chloride, which has a fine grain and is obtained in a yield of about 40 to 50%, is washed with water and then dried. The resultant polyvinyl chloride is insoluble in all of the conventional solvents for polyvinyl chlorides up to temperatures of 80° C. At higher temperatures, (and under pressure if necessary) it is soluble in tetrachlorethane, methylene chloride, chlorobenzene, chlorotoluene, cyclohexanone, tetralin and also in many plasticizers such as tricresyl phosphate, dibutyl phthalate and others. The solutions are of a highly gelatinous character.

*Example II*

A mixture consisting of 700 parts by weight of vinyl chloride (purified as in Example I immediately before use), 300 parts by weight of vinyl acetate, 1000 parts by weight of water, 2 parts by weight of benzoyl peroxide and 5 parts by weight of a water-soluble partial hexyl ether of polyvinyl alcohol is continuously stirred in a $V_4A$ steel autoclave at a constant temperature of 35° C. for 150 hours. After this treatment the non-polymerized portions of the mixture are distilled out of the autoclave. The resultant polymer, having a pure white color and a fine grain, is washed with water and then dried. The yield is 40 to 50%. The dried product contains about 41% chlorine. This product, in contra-distinction to the highly polymerized pure polyvinyl chloride obtained in Example I, is soluble in the solvents enumerated in Example I at temperatures below 80° C.; it is also soluble in acetone. The solutions of this product have far less tendency to gel than the solutions of pure polyvinyl chloride.

*Example III*

A mixture of 900 parts by weight of vinyl chloride, (purified as in Example I) 100 parts by weight of vinyl acetate, 1000 parts by weight of water, 2 parts by weight of benzoyl peroxide and 10 parts by weight of methyl cellulose is continuously stirred in an autoclave of nickel plated forged iron at a constant temperature of 35° C. for 100 hours. Thereafter the non-polymerized portions are distilled off as described in Example II. The resultant polymer has a pure white color and a fine grain. The yield is 40%. The dried product contains 52% chlorine. Due to its higher chlorine content solutions thereof in acetone are turbid.

*Example IV*

A mixture consisting of 500 parts by weight of vinyl chloride (purified as in Example I), 500 parts by weight of vinyl acetate, 1000 parts by weight of water, 2 parts by weight of benzoyl peroxide and 5 parts by weight of the ammonium salt of the cellulose ether of glycollic acid (prepared by the reaction of sodium cellulose with monochloracetic acid) are treated in the way described in Example II. A 40 to 50% yield of a pure white polymer having a fine grain is obtained. This polymer is readily soluble in acetone and in the other solvents enumerated in Example II. The dried product contains 31% chlorine.

*Example V*

A mixture of 800 parts by weight of vinyl chloride and 200 parts by weight of chloroprene is passed, in the vapor phase, through a washing tower filled with 50% aqueous sodium hydroxide solution. The washing liquid is kept at a temperature of 30° C. to avoid condensation of the chloroprene. One thousand parts by weight of the thus purified mixture and 5 parts by weight of benzoyl peroxide is kept at a constant temperature of 40° C. in an autoclave, having a $V_2A$-steel lining, for 120 hours. At the end of this time the non-polymerized portions are distilled off. The resultant polymer is soluble in the solvents enumerated in Example I.

*Example VI*

400 parts by weight of 2-chloro-1,3-butadiene is purified by the action of a 50% caustic alkali solution and then partially polymerized by the action of light. After the addition of 1% of N-phenyl-naphthylamine, the partial polymer is slowly run into 400 parts by weight of a 2% aqueous solution of a partial acetate of polyvinyl alcohol (saponification number 80 to 100) and emulsified therein by vigorous stirring. After distilling off the monomeric portions, the polymer is obtained as a suspension. The polymer is soluble in benzol.

*Example VII*

A mixture of 100 parts by weight of 2-chloro-1,3-butadiene, which has been washed with a concentrated caustic solution, 120 parts by weight of pure vinyl acetate and 2 parts by weight of benzoyl peroxide is polymerized for a period of 12 hours to give a 60 to 70% yield. The monomers are then distilled off. A viscous polymer, which is almost free from odor, is obtained; it may be rendered soluble in benzol by the addition of 10–30% tricresyl phosphate.

The polymerization of the monomers purified in accordance with the present invention proceeds smoothly and uniformly. Utilizing any given polymerization method it is possible to obtain reproducible results consistently, whereas with unpurified monomers the polymerization frequently takes an erratic and unpredictable course.

The highly polymerized products of the invention are insoluble or difficultly soluble in most organic solvents at ordinary temperatures; they can be dissolved, however, in various solvents such as chlorotoluene or chlorobenzene at elevated temperatures (using correspondingly elevated pressures if necessary) to form viscous solutions or gels. The solutions or gels thus formed may be molded or they can be extruded through nozzles, slots or the like, to form tubes, films, threads or the like.

It is desirable, for most purposes, to incorporate plasticizers with the polymeric products. In general, high boiling plasticizers are preferable. Suitable plasticizers include the well-known phthalic acid esters and the phosphates of phenols and cresols. We have found, however, that such plasticizers are most effective when used in conjunction with esters of fatty acids, particularly esters of acetylated or alkylated hydroxy fatty acids. Especially suitable as such alkylated and acetylated esters are the esters of hydroxy fatty acids prepared according to German Patent No. 642,454, more particularly according to Examples I, II and V of that patent. Thus an ester of ricinoleic acid which is prepared by reacting methanol and castor oil in the presence of sodium or by reacting castor oil with ethyl alcohol or butyl alcohol in the presence of hydrochloric acid are especially suitable. Also, esters similarly prepared from linseed oil and olive oil can be advantageously used.

The plasticizers or softening agents may be incorporated with the polymers by methods commonly used in the plastic art, as by trituration, kneading or rolling mixtures thereof before subjecting them to the molding or other forming process. The plasticized mixtures, which advantageously contain 10 to 50% of plasticizer, are preferably also subjected to a heat treatment which can be effected before or simultaneously with or subsequent to the molding operations. This "tempering" of the softened materials can be effected by subjecting the some to temperatures just below the flow point, e. g. at about 150 to 180° C. for polyvinyl chloride for a short time. At lower temperatures a substantially longer treatment is required. The heat treatment serves to increase the elasticity and tensile strength of the treated material.

In many cases the properties of the polymers may be further improved by mechanical working. Thus, in the manufacture of extruded articles such as threads, sheets and tubes, it is often advantageous to subject the extruded material to progressive stretching as has been practiced heretofore with polymeric materials having a long chain molecular structure.

The following examples illustrate specific plasticizing agents and procedures which may be utilized in accordance with the invention:

Example VIII 60 grams of polymerized polyvinyl chloride (prepared by the process of Example I) is mixed between kneading rolls with 20 grams of tricresyl phosphate and 20 grams of butyl oleate at a temperature of 30° C. for 30 minutes. The mixture is then pressed in a heated press for 10 minutes at a pressure of 15 kg./sq. cm. The working time may be shortened by the use of higher temperatures; thus by mixing at 150° C. for 5 minutes the material can be pressed in 5 minutes at the same applied pressure. The resultant molded mass is not discolored by exposure to such temperatures.

Example IX 50 grams of polymerized vinyl chloride (as prepared by the method of Example I), 10 grams of kaolin, 20 grams of the butyl ester of acetyl ricinoelic acid and 20 grams of tricresyl phosphate are mixed and softened as described in Example VIII. The resultant mixture is heated to a temperature of 180° C. This heat treatment may be carried out between heating rolls before molding or in a heated press or other molding apparatus while molding or in a drying chamber or the like subsequent to molding. The resultant product has substantially improved mechanical properties and is elastic even at temperatures as low as −30° C. This material does not exhibit "cold flow" even at pressures up to 15 kg./sq. cm. and at temperatures up to 50° C.

The influence of the time factor in the heat treatment is shown in the following table:

| Time of heating | Elongation | Tensile strength |
| --- | --- | --- |
|  | Per cent | Kg. per sq. cm. |
| 0 minutes | 160 | 89 |
| 45 minutes | 725 | 140 |
| 90 minutes | 740 | 170 |

Example X 59 grams of polymerized vinyl chloride (as prepared in Example I) and 1 gram of kaolin are plasticized according to the method of Example VIII with 20 grams of the butyl ester of acetyl ricinoleic acid and 20 grams of tricresyl phosphate and the resultant mass is heat-treated as in Example IX. The resultant product is extremely resistant to heat; even when heated for days in a drying chamber at 130° C., only a slight discoloration appears. The loss in weight resulting from this treatment is only 1 to 2%. The material remains completely elastic even when heated for 24 hours at 160° C., and it does not become hard or brittle after cooling. It may be extruded around electrical conductors in an extrusion machine at temperatures of 150° to 180° C. The coatings thus obtained are characterized by excellent mechanical and electrical properties.

Example XI 45 grams of polymerized vinyl chloride (prepared as in Example I), 5 grams of titanium white, and 10 grams of a mixed polymer as prepared according to Examples II, III or IV above are plasticized according to Example VIII with 20 grams of a glyceride of tributoxy acetic acid and 20 grams of tricresyl phosphate. The mixture may be extruded in an extrusion machine to form tubing, or rolled into the form of sheets. The sheets, etc. may be adhesively joined by applying thereto a solvent, such as cyclohexanone, pyridine, or an acetone solution of the mixed polymers, and heating to a temperature of 50–120° C.

Example XII 90 grams of polymerized vinyl chloride (prepared as in Example I) is plasticized according to Example VIII with 5 grams of butyl linoleate and 5 grams of tricresyl phosphate. The mixture is dissolved under pressure in 200 cubic centimeters cyclohexanone or trichlorethane and threads are made from this solution in the conventional manner. Such threads are permanently pliable; fabrics made therefrom show excellent resistance to acids, alkalies and heat.

Example XIII 80 grams of polymerized vinyl chloride (prepared as in Example I) and 10 grams of fillers (e. g. kaolin plus pigments or dyes) are plasticized according to Example VIII with 5 grams of tricresyl phosphate and 5 grams of acetyl ricinoleic acid ethyl ester and pressed at 120 to 180° C. under a pressure of 25 kg./sq. cm. to solid plastic masses. This material is especially suitable for the manufacture of sound recording disks and the like.

Example XIV 40 grams of polymerized vinyl chloride (prepared as in Example I), 32.5 grams of fillers and 0.5 gram of a suitable color are plasticized as in Example VIII with 13.5 grams of tricresyl phosphate and 13.5 grams acetyl ricinoleic acid methyl ester and pressed into the form of sheets. The sheet material is suitable for use as a covering for laboratory tables and the like, being resistant to organic and inorganic acids, alkalies and most solvents.

Example XV

A mixture of 27 grams of polymerized vinyl chloride (prepared as in Example I), 8 grams tricresyl phosphate, 8 grams of butyl oleate and 57 grams of micro-asbestos is formed by rolling at a temperature of 150 to 160° C. to form a homogeneous mass, the vinyl chloride being first incorporated with the plasticizers and the fillers being added gradually during the rolling operation. The material may be formed into excellent oil and solvent resistant gaskets.

Example XVI 40 grams of polymerized vinyl chloride (prepared as in Example I), 15 grams of "Palatinol," a proprietary phthalic ester softener), 0.15 gram of butyl stearate and 30 grams of talcum are gradually introduced into 450 grams of monochlorbenzene at a temperature of 120° C. while stirring the mixture. The resultant thin liquid paste is applied to a textile fabric, the solvent evaporated and the impregnated fabric pressed with a hot iron. The resultant fabric is impermeable to water and has very good mechanical properties.

Example XVII

A mixture of 79 grams of polymerized vinyl chloride (prepared as in Example I) and 1 gram of kaolin is plasticized with 10 grams of butyl stearate and 10 grams of tricresyl phosphate according to the procedure of Example VIII. At a temperature of 80–100° C. the material can be rolled into sheets or, at a temperature of 120° C. molded under a pressure of 15 kg./sq. cm. One hundred grams of the plasticized product, after being allowed to swell for one day in a mixture of 50 cc. of cyclohexanone and 50 cc. of pyridine will dissolve in 100 grams of methylene chloride. From such solutions films and the like may be produced. Such films are suitable for use as supports for photographic emulsions and for similar purposes. The solutions are also adapted to be used for impregnating purposes.

The products of the invention are characterized by high tensile strength, excellent elasticity, resistance to the action of cold and heat, freedom from "cold flow," outstanding electrical insulating properties and resistance to oils, organic solvents, ozone, hydrogen peroxide, alkalies, acids, halogens and other corrosive agents. These properties enable them to be used for many purposes for which the lower polymers of vinyl halogen compounds have not been considered well suited as, for example: insulating coverings for replacing the conventional lead sheaths for cables; electrical insulation material in general; hoses, tubes, gaskets, etc., which are highly resistant to oils and organic solvents; membranes and elastic machinery parts of various kinds; artificial leather and linoleum substitutes; laminated goods of various kinds, and articles manufactured therefrom, such as storage battery cases and non-breakable phonograph records; molded articles of various kinds; non-breakable combs, toilet and hygienic articles; elastic orthopoedic articles; noninflammable films, foils and plates; other miscellaneous articles such as non-breakable and noninflammable toys, more particularly dolls; non-breakable fountain pens; transmission belts; friction couplings; impregnated textile fabrics such as tire fabrics, canvas for tents and other equipment requiring high mechanical strength and resistance to temperature and solvents; age-resistant tires; permanently resilient and tight gaskets for doors, gas-tight enclosures and the like; bottle closures and containers for foods, cosmetics and other products; and noninflammable textile fibers and fabrics made therefrom.

It is to be understood that the invention is not restricted to the particular embodiments thereof described hereinabove, but embraces all such modifications, variations and equivalents as fall within the scope of the appended claims.

We claim:

1. The process for purifying vinyl chloride to remove impurities which tend to promote formation of low molecular weight polymers which comprises subjecting said vinyl chloride in the vapor phase and at a temperature above its boiling point to the action of an aqueous solution of an alkali metal hydroxide.

2. The process for purifying vinyl chloride to remove impurities which tend to promote formation of low molecular weight polymers which comprises subjecting said vinyl chloride in the vapor phase and at a temperature above its boiling point to the action of an aqueous solution of an alkali metal hydroxide of 25 to 60% concentration.

HERBERT BERG.
HERBERT MADER.